United States Patent [19]
Bennett et al.

[11] 3,984,122
[45] Oct. 5, 1976

[54] TRAILER COUPLING AND DROP-LEG APPARATUS

[75] Inventors: Paul F. Bennett, San Marino; Alphonsus E. Koot, Fullerton, both of Calif.

[73] Assignee: Utility Trailer Manufacturing Company, City of Industry, Calif.

[22] Filed: Apr. 7, 1975

[21] Appl. No.: 565,540

Related U.S. Application Data

[63] Continuation of Ser. Nos. 244,159, April 14, 1972, abandoned, and Ser. No. 412,663, Nov. 5, 1973, abandoned.

[52] U.S. Cl. ............................... 280/430; 280/435
[51] Int. Cl.² ........................................ B62D 53/08
[58] Field of Search ........... 280/427, 428, 429, 430, 280/431, 435

[56] References Cited
UNITED STATES PATENTS

| | | | |
|---|---|---|---|
| 2,471,555 | 5/1949 | Bennett | 280/431 |
| 2,809,054 | 10/1957 | Miller | 280/429 |
| 3,253,839 | 5/1966 | Warren | 280/429 X |

Primary Examiner—M. H. Wood, Jr.
Assistant Examiner—R. Schrecengost
Attorney, Agent, or Firm—Lyon & Lyon

[57] ABSTRACT

A semi-trailer is provided with a pair of laterally spaced drop-leg assemblies operated by a tubular cross shaft mounted on the trailer frame. These drop-leg assemblies are widely spaced and are positioned near the side boundaries of the frame. A jaw member is mounted to turn on the frame at a location forward of the drop-leg assemblies and has an open-ended channel to accept the king pin on the truck. A pair of cables each having one end attached to the jaw member each contact the drum surface and extend partially around the cross shaft in opposite directions. Adjustable means are provided for securing one end of each cable to the cross shaft so that turning movement of the jaw member causes corresponding turning movement of the cross shaft. One end of one of the cables is pivotally attached to the jaw member to compensate for limited arcuate length of the drum occasioned by presence of the open-ended channel to receive the king pin. Each drop-leg assembly includes a gravity-actuated support leg movable to one of three extended positions and each support leg is retracted by means of a chain operated by the cross shaft.

7 Claims, 9 Drawing Figures

TRAILER COUPLING AND DROP-LEG APPARATUS

This is a continuation of application Ser. Nos. 244,159 and 412,663 filed Apr. 14, 1972 and Nov. 5, 1973 and now abandoned.

This invention relates to semi-trailers of the type having drop-leg assemblies operated by the trailer coupling device. The present invention constitutes an improvement over the device shown in the Bennett patent, U.S. Pat. No. 2,471,555 granted May 31, 1949.

In the device of the present invention, as compared to the device disclosed in said Bennett patent, the drop legs may be positioned closer to the forward end of the semi-trailer while still maintaining the same swing clearance for the rear tires of the truck. The cross shaft which operates the drop legs is positioned at a high elevation on the trailer so that at least a portion of the cross shaft extends above the forward under surface of the semitrailer. The result is that the cross shaft is out of the range of swing movement of the truck tires, and the drop-leg assemblies themselves limit the clearance distance for the truck tires.

Also, in the device of the present invention the tension adjustment for the cables which extend between the rotary locking jaw for the king pin and the cross shaft for the drop-leg assemblies each have a tension adjustment located adjacent the cross shaft, instead of adjacent the locking jaw. Also, the connections between the cables and the locking jaw can be installed and removed from the underside of the trailer frame. These features eliminate the need for a trap door in the floor of the trailer above the locking jaw. Also, the cables extend longitudinally and in substantially parallel relationship between the drum surface on the locking jaw and the cylindrical surface of the cross shaft. This provides a stiffer, stronger system and permits the clearance holes in the trailer frame cross members to be located at a standardized position.

Another advantage of the device of the present invention as compared to the device of the Bennett Patent is that neither cable passes over the top of the king pin during locking or unlocking motion of the jaw, thus permitting the total depth of the king pin subframe to be reduced. This feature is accomplished by providing a pivotal connection between one of the cables and the locking jaw, permitting a shorter arcuate length of the drum surface on the locking jaw, which drum surface is contacted by both cables during at least a part of the turning motion of the jaw.

Other and more detailed objects and advantages will appear hereinafter.

Figure 1:
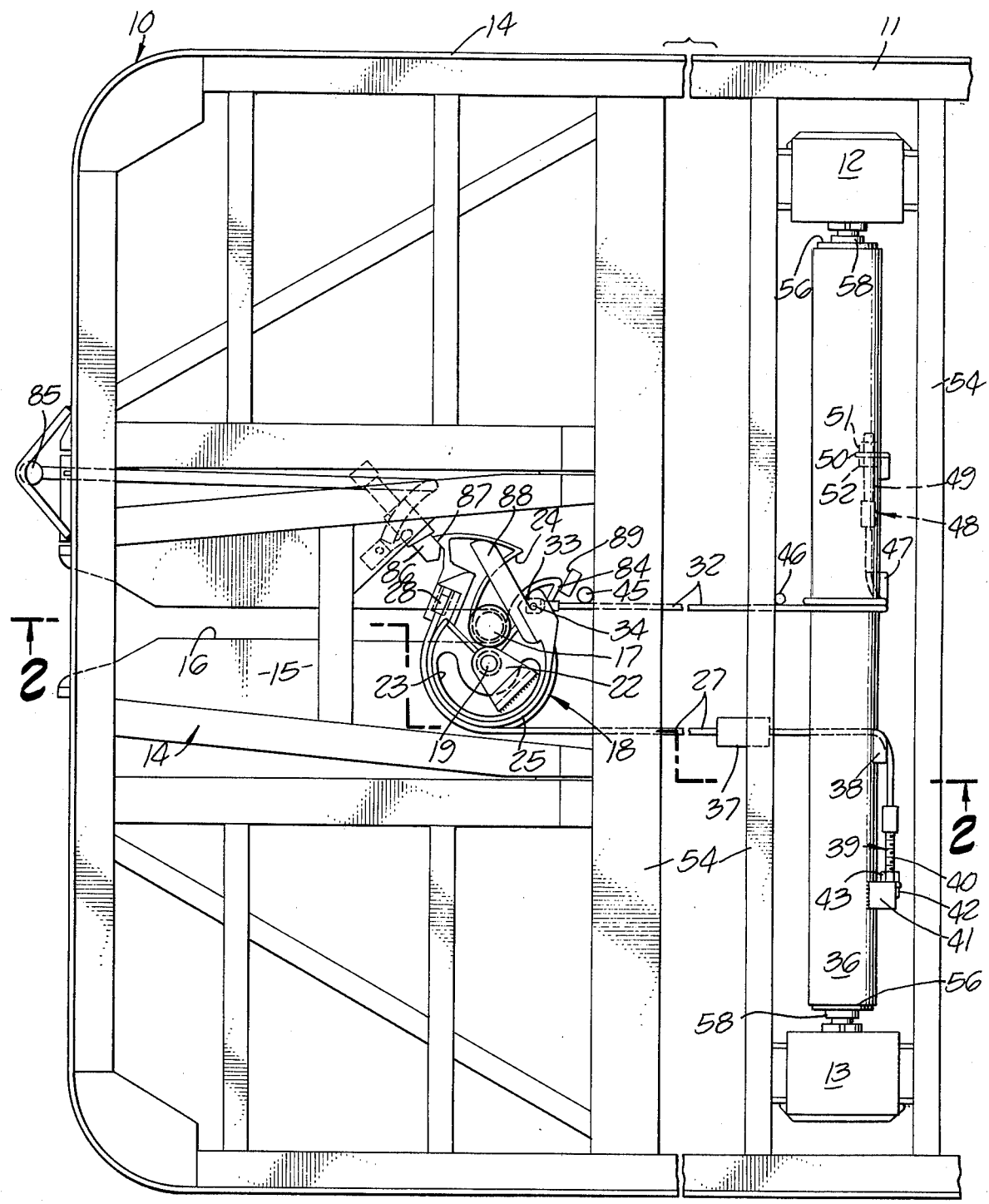
FIG. 1 is a plan view partly broken away, showing the forward section of a semi-trailer and illustrating a preferred embodiment of this invention, the parts being shown in locked position.
Figure 2:
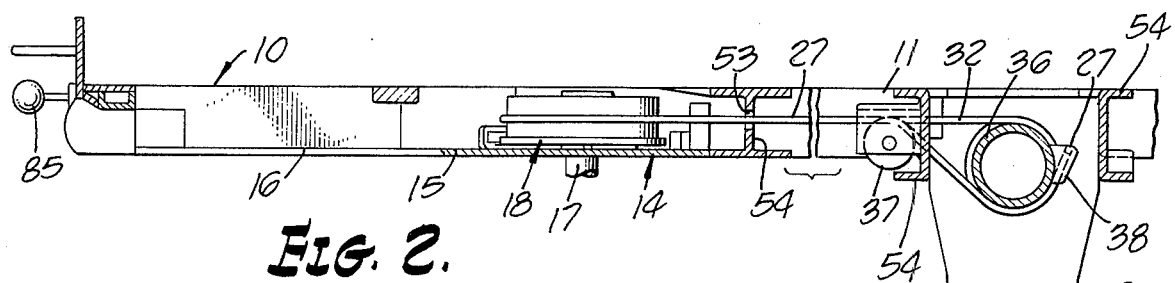
FIG. 2 is a sectional elevation taken substantially on the lines 2—2 as shown in FIG. 1.

Referring to the drawings, the semi-trailer generally designated 10 includes a structural frame 11 provided with a pair of laterally spaced drop-leg assemblies 12 and 13. The frame 11 has a front portion 14 extending forward of the drop-leg assemblies 12 and 13 and this front portion 14 has an under surface 15 provided with a longitudinal guide slot 16 to receive the king pin 17. This king pin 17 is mounted on the truck tractor, now shown, used with the semi-trailer 10.

The swing clearance of the rear tires of the truck tractor is determined by the position of the drop-leg assemblies 12 and 13.

A rotary jaw member generally designated 18 is mounted to turn about the stationary vertical pin 19 fixed as by welding 20 to the front portion 14 of the frame 11. An angle brace 22 also fixed to the frame 11 is fixed to the upper end of the stationary pin 16. This brace 22 extends through an arcuate clearance opening 23 in the jaw member 18. A recessed grease fitting 21 accessible from the under surface 15 is provided in the stationary pin 19 for lubricating the rotary joint between the pin 19 and the jaw member 18.

The jaw member 18 is provided with a curved open-ended channel 24 to accept the king pin 17 and thereby lock the king pin with respect to the semi-trailer when the jaw member 18 is turned to the position shown in FIG. 1. The jaw member 18 is provided with a drum surface 25 which constitutes a portion of a cylinder concentric with the axis of the pin 19. A first cable 27 contacts the drum surface 25 and is provided with a terminal fitting 28 which is installed lengthwise within a socket 29 provided on the jaw member 18. An end wall 30 of the socket 29 is engaged by the terminal fitting 28. A slot 31 in a wall of the socket 29 permits lateral insertion of the cable 27. A second cable 32 contacts the drum surface 25 and is provided with a terminal fitting 33 having oppositely directed vertical trunnions 34 received in aligned recesses 35 provided in the jaw member 18. The terminal fitting 33 is free to pivot with respect to the jaw member 18 from the position shown in FIG. 1 to the position shown in FIG. 3. Both of the terminal fittings 28 and 33 with their attached cables can be manually installed and removed from the jaw member 18 from the underside of the forward portion 14 of the frame 10, when the cables are slack.

A horizontal cross shaft 36 comprising a hollow tubular member extends between the drop-leg assemblies 12 and 13. A portion of this cross shaft 36 extends above the level of the under surface 15 of the forward portion 14 of the trailer frame 11. The cables 27 and 32 extend longitudinally from the drum surface 25 in substantially parallel relationship longitudinally of the trailer. The cables extend around the cross shaft 36 in opposite directions. Thus, the cable 27 passes over a guide pulley 37 and then under the cross shaft 36 and then at right angles around the block 38. The terminal connection 39 for the cable 27 extends in a direction parallel to the axis of the cross shaft 36 and comprises a threaded member 40 fixed to the cable 27 and attached to a bracket 41 on the cross shaft 36 by means of a nut 42. A lock nut 43 prevents disassembly. Similarly, the cable 32 contacts guide rollers 45 and 46 mounted on the frame 11 and extends over and around the cross shaft 36 and then at right angles around the block 47 fixed to the cross shaft 36. The terminal connection 48 for the cable 32 is adjustable and extends in a direction parallel to the axis of the cross shaft 36. The construction is similar to that of the terminal connection 39 and includes a threaded member 49 passing through a bracket 50 fixed on the cross shaft 36 and engaged by a nut 51. The lock nut 52 prevents disassembly.

It will be observed that the cables 27 and 32 extend longitudinally of the trailer in substantially parallel relationship, and therefore the clearance openings 53 in the cross members 54 are all spaced apart by the same distance.

A circular plate 56 is secured within each end of the cross shaft 36 and provided with a central noncircular opening 57. A concentric pilot ring 58 is welded to the plate 56. The drop-leg assemblies 12 and 13 are duplicates except for right hand and left hand, and therefore only one need be described. Each has a crank shaft 60 mounted in spaced bearings 61 and 62 and provided with a noncircular projecting element 63 which fits within the noncircular opening 57 in one of the plates 56. A portion of the crank shaft 60 is guided by the pilot ring 58. The stationary housing 64 which carries the bearings 61 and 62 is positioned between frame cross members 54 and is fixed to the frame 11 by welding. From this description it will be understood that the cross shaft 36 is supported for rotation from the crank shafts 60 of the drop-leg assemblies 12 and 13.

Vertical walls 65 on housing 64 form a guide which slidably receives the vertical support leg 66. At its lower end the leg 66 is connected to a foot piece 67 by means of a pivot pin 68. The leg 66 and the foot piece 67 slide downward by gravity, and means actuated by the cross shaft 36 are provided for lifting the support legs to the retracted position shown in FIG. 6, or the intermediate position shown in FIG. 8, or the fully extended position shown in FIG. 9. There is another intermediate position of the support legs between the positions shown in FIGS. 8 and 9, as described below.

The crank 70 on the shaft 60 is pivotally connected at 71 to one end of a chain 72. The other end 73 of the chain 72 is pivotally connected to lug 74 formed on an internal wall 75 fixed to the support leg 66. When the crank 70 is turned clockwise, as viewed in FIG. 6, the chain 72 passes over the rounded projection 76 on the crank to lift the support leg 66 and foot piece 67 to their retracted position. When the crank 70 is turned in a counterclockwise direction to the position shown in FIG. 8, the tension in the chain 72 is relaxed and the support leg 66 falls by gravity until the foot piece 67 encounters the ground or other surface upon which the trailer wheels rest. If the support leg 66 falls only to the position shown in FIG. 8 because of contact of the foot piece 67 with the ground or other surface, the lug 77 on the crank 70 is engaged by the shoulder 78 formed on a wall of the support leg 66. A face 79 of the lug 77 engages the vertical wall 80 on the support leg 66 to limit counterclockwise rotation of the crank 70, as viewed in FIG. 8. The crank 70 must move at least to this FIG. 8 position before the king pin 17 can be released from the jaw channel 24. The jaw member 18, cable 32 and cross shaft 36 must be strong to resist deflection in the event an attempt is made by the truck driver to separate the truck from the semi-trailer before both legs 66 have dropped at least to the FIG. 8 position, because these parts are the ones which prevent premature release of the king pin 17 from the curved channel 24 of the jaw member 18.

Figure 8:
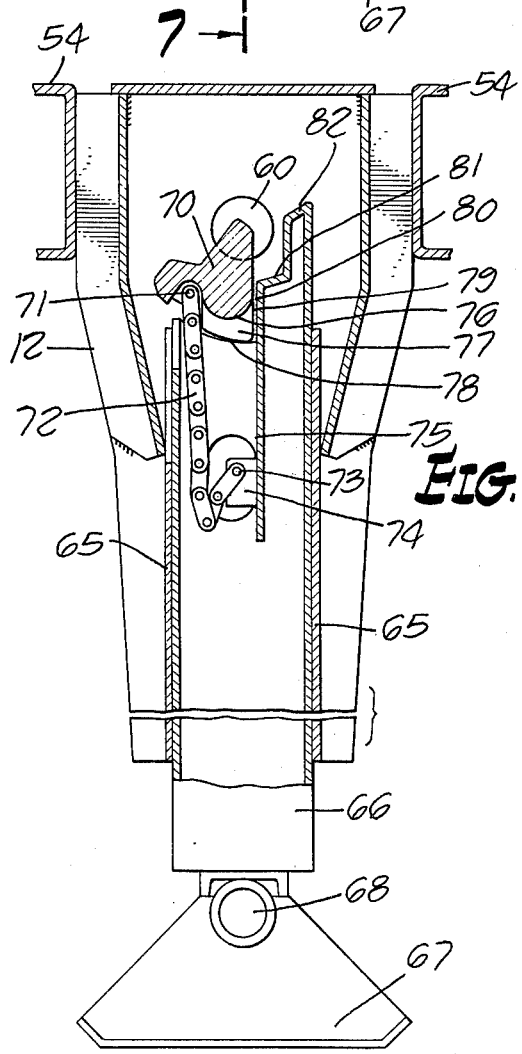
FIG. 8 is a sectional elevation similar to FIG. 6 but showing the parts in an intermediate position.

If the support leg 66 drops further than the FIG. 8 position, the lug 77 may rest on the shoulder 81. If the support leg 66 drops to the fully extended position before the foot piece 67 encounters the ground or other surface, the chain tension moves the lug 77 to the position shown in FIG. 9 in which it overlies the surface 82 formed on a wall of the support leg 66. In this FIG. 9 position, further counterclockwise turning movement of the crank 70 is prevented by engagement of the parts 84 and 89.

In operation, the truck and semi-trailer move over the road until the loading or unloading location is reached. Adequate clearance is provided for the rear wheels of the truck in the space below the trailer under surface 14 and forward of the drop-leg assemblies 12 and 13. The cross shaft 36 is located at such a high elevation that it is impossible for it to be contacted by the rear wheels of the truck, and the turning clearance is determined by the position of the drop-leg assemblies 12 and 13.

Figure 6:
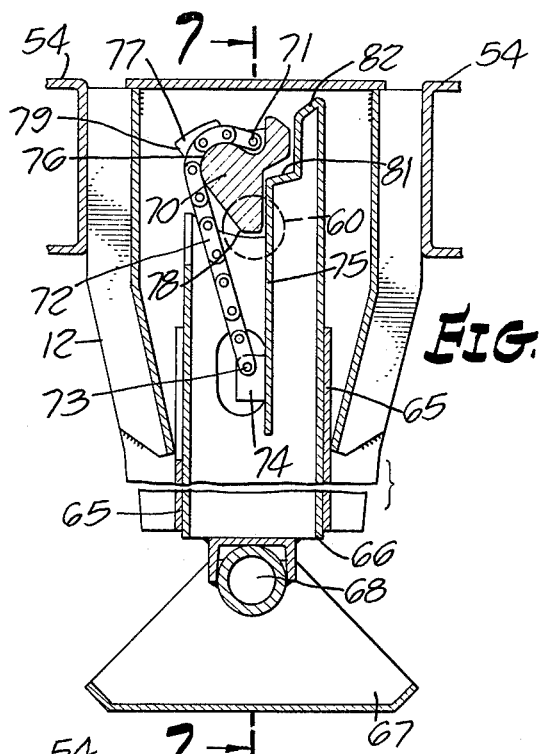
FIG. 6 is a sectional side elevation partly broken away, showing one of the drop-leg assemblies for the semi-trailer in retracted position.
Figure 7:
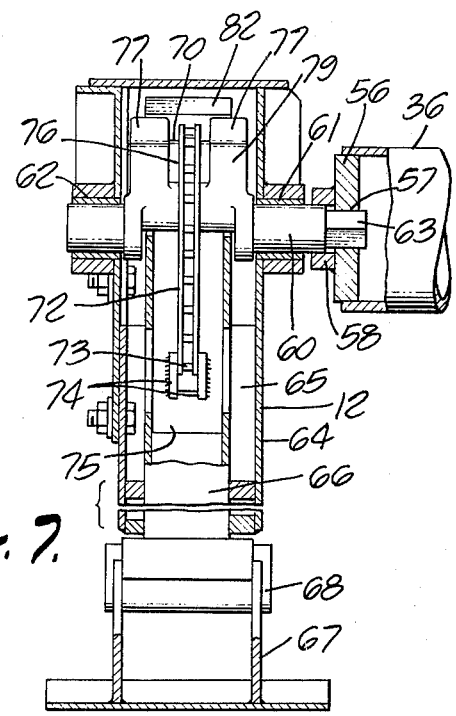
FIG. 7 is a sectional view taken substantially on the lines 7—7 as shown in FIG. 6.

When the loading or unloading location is reached, the semi-trailer is usually backed up to a loading dock, not shown. The parts are then in the position as shown in FIGS. 1 and 6. When it is desired to disconnect the truck from the semi-trailer to permit the truck to be used while the semitrailer is being loaded or unloaded, the lever 85 at the forward end of the semi-trailer is manually operated to retract the latch 86. The trailer brakes are set and the truck is then moved forward so that the king pin 17 moves from the locked position shown in FIG. 1 to the unlocked position shown in FIG. 3, the king pin 17 moving along the slot 16 from the underside of the trailer and out through the curved channel 24 under the bridge piece 88. During this turning movement of the jaw member 18, the cable 32 is tensioned and this causes the cross shaft 36 to turn in a direction to permit gravity-lowering of the support legs 66. Turning movement of the cross shaft 36 caused by tension in the cable 32 serves to wrap the cable 27 around the cross shaft to maintain tension. The proportions of the parts are such that the face 79 on each crank lug 77 approaches the wall surface 80 before the king pin 17 can escape from the curved channel 24. Accordingly, the support legs 66 must drop at least to the intermediate position shown in FIG. 8 to permit the truck to become disconnected from the semi-trailer. This feature is important when the truck wheels remain on a level surface while the trailer wheels rest on an inclined ramp adjacent a loading dock. In such case, the trailer bed is inclined less steeply than the ramp and the intermediate extension of the support legs is sufficient to hold the disconnected trailer at the desired elevation. It also insures the reconnection of the truck and king pin may readily be accomplished.

Figure 9:
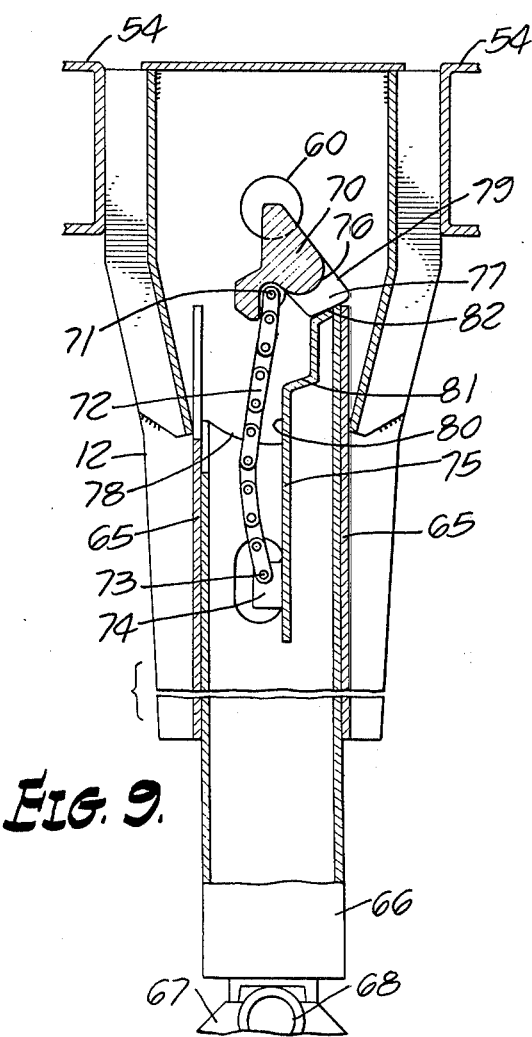
FIG. 9 is a sectional view similar to FIG. 8, showing the parts in extended position.

In the normal situation where both truck and trailer rest on a level surface for loading or unloading, the support legs 66 drop to the fully extended position shown in FIG. 9 before the load is transferred from the truck to the support legs 66.

When the truck is to be reconnected to the free standing semi-trailer, the truck is backed up to cause the king pin 17 to move through the slot 16 and to enter the open-ended channel 24 in the jaw member 18. At this time, the load at the forward end of the semi-trailer is carried on the truck and the support legs 66 no longer carry any weight. Continued motion of the king pin 17 along the slot 16 causes turning movement of the jaw member 18 in a clockwise direction as viewed in FIG. 3. This tensions the cable 27 to turn the cross shaft 36 in a direction to tighten the chains 72 to lift the support legs 66 clear of the ground. When the parts reach the position shown in FIGS. 1 and 6, the shoulder 84 on the jaw member 18 strikes the stationary stop surface 89 on the frame 11. The latch 86 re-engages the latching surface 87, and the jaw member 18 is thus held against turning movement in either direction. This completes the steps in the operation for connecting the truck of the semi-trailer.

Figure 3:
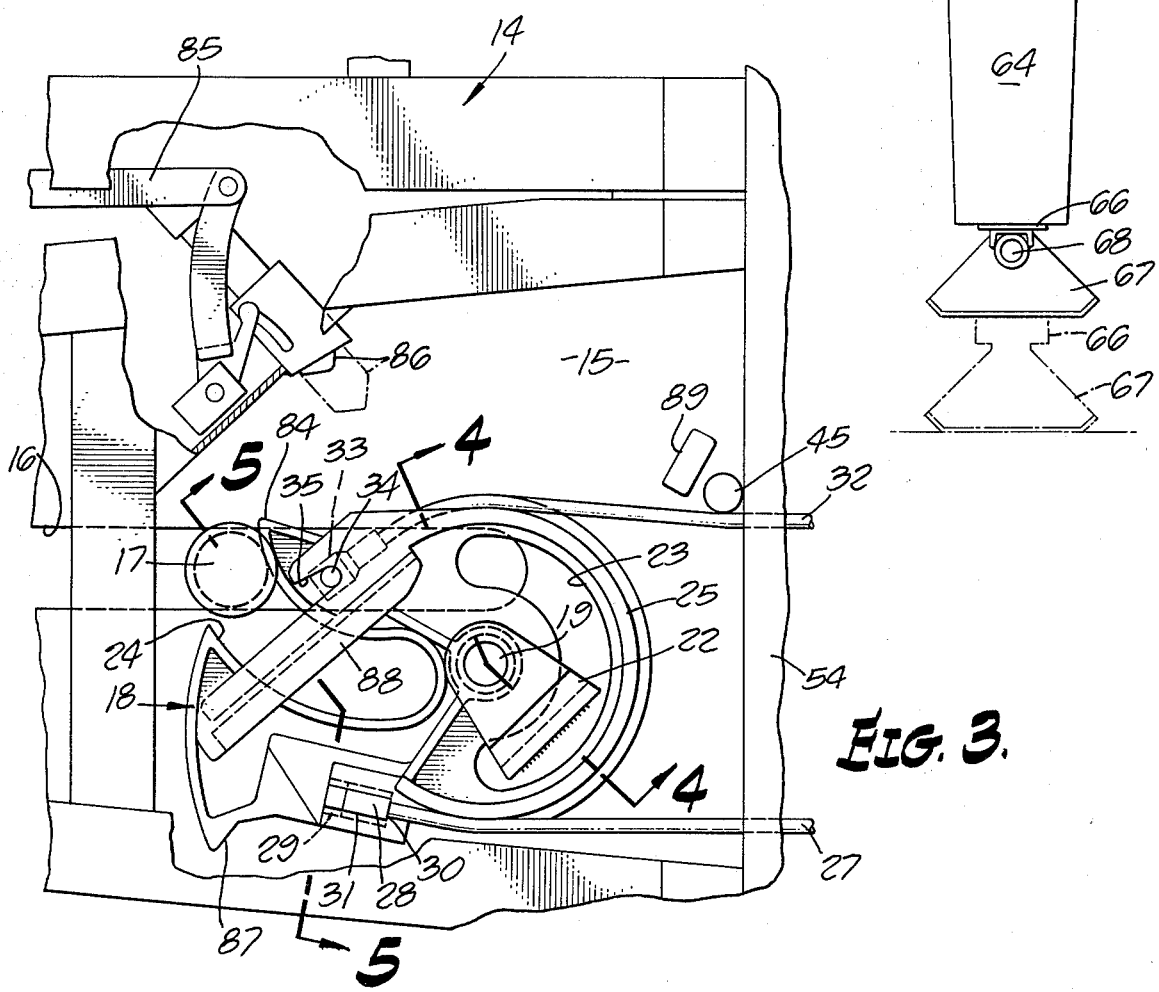
FIG. 3 is a plan view partly broken away, showing a portion of FIG. 1, the parts being shown in unlocked position.
Figure 4:
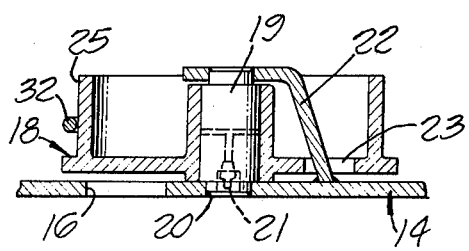
FIG. 4 is a sectional detail taken substantially on the lines 4—4 as shown in FIG. 3.
Figure 5:
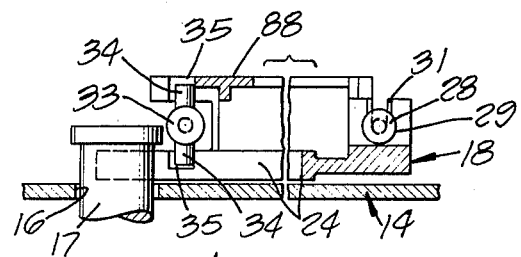
FIG. 5 is a sectional detail taken substantially on the lines 5—5 as shown in FIG. 3.

During the turning motion of the jaw member 18 from the open position shown in FIG. 3 to the locked position shown in FIG. 1, the cable 32 leaves the drum surface 25 as the terminal fitting 33 pivots on its trunnions 34. At this time the pivotal mounting of the cable end 33 serves to minimize slack in the cables 27 and 32, even though the arcuate extent of the drum surface 25 is insufficient to keep both cables in constant contact with it. The arcuate extent of the drum surface 25 is limited because of the necessary presence of the curved channel 24 for the king pin 17.

Having fully described our invention it is to be understood that we are not to be limited to the details herein set forth but that our invention is of the full scope of the appended claims.

We claim:

1. For use with a tractor having an upstanding king pin, a semi-trailer having, in combination: a frame provided with a pair of laterally spaced drop-leg assemblies, the frame including a front portion extending forward of said drop-leg assemblies and having an under surface provided with a longitudinal guide slot to receive the king pin, a jaw mounted to turn on the front portion of the frame about a vertical axis, said jaw having an open-ended channel to accept the king pin and thereby lock the king pin with respect to the trailer upon turning movement of the jaw, said jaw having a concentric drum surface, a pair of cables each having one end attached to the jaw and each contacting the drum surface, a cross shaft mounted to turn on the trailer frame and extending between said drop-leg assemblies, at least a portion of the cross shaft extending above the level of said under surface, said cables extending longitudinally from the drum surface in substantially parallel relationship toward the cross shaft and extending at least partially around the cross shaft in opposite directions, a cable adjustment means secured to each cable and mounted on the cross shaft, each cable adjustment means being accessible from under the semi-trailer for tensioning each cable independently, whereby turning movement of the jaw causes corresponding turning movement of said cross shaft, and means whereby turning movement of the cross shaft operates said drop-leg assemblies.

2. The combination set forth in claim 1 in which each adjustment means is mounted longitudinally on the cross shaft and an adjusting screw is attached to the end of a corresponding cable, and a means is provided for each cable to guide the cable from a circumferential direction to a longitudinal direction with respect to the cross shaft.

3. The combination set forth in claim 1 in which one of the cables has one end fixed to said jaw and the other cable has one end pivotally supported on the jaw for movement about an axis parallel to the turning axis of the jaw.

4. In combination, a semi-trailer having a frame provided with a pair of laterally spaced drop-leg assemblies, said frame having a portion provided with a longitudinal guide slot to receive a king pin, a jaw mounted to turn on the frame about a vertical axis, said jaw having an arcuate concentric drum surface and an open-ended channel extending between the ends of the drum surface, said channel being adapted to accept the king pin to lock it with respect to the semi-trailer upon turning movement of the jaw, means for operating said drop-leg assemblies, said means including a pair of cables positioned to contact said drum surface, fixing one end of one of said cables to said jaw on one side of said channel, means pivotally attaching the other of said cables to said jaw on the other side of said channel.

5. The combination with a semi-trailer including a pair of drop-leg assemblies having horizontally disposed axially aligned rotatable shafts; a king pin guide slot; a king pin receiving jaw structure rotatable about a vertical axis; of a drive means connecting the jaw structure, comprising: a horizontal connecting shaft extending between and connected to the drop-leg assembly shafts; a pair of cables secured to the king pin receiving jaw and extending therefrom about the connecting shaft in opposite directions; means guiding the end portion of each cable in a direction longitudinally of the connecting shaft; and a cable adjustment means secured to the end portion of each cable and disposed longitudinally on the connecting shaft, the adjustment means being accessible from under the semi-trailer for tensioning each cable independently.

6. For use with a tractor having rear wheels and having an upstanding king pin, a semi-trailer having, in combination: a frame provided with a pair of drop-leg assemblies widely spaced and positioned near the side boundaries of the frame, each drop-leg assembly having a stationary housing projecting downward from said frame, said housings being positioned near the forward end of the trailer to minimize the swing clearance with respect to the rear wheels of the tractor, said frame including a front portion extending forward of said drop-leg assemblies and having an under surface provided with a longitudinal guide slot to receive the king pin, a jaw mounted to turn on the front portion of the frame about a vertical axis, said jaw having an open-ended channel to accept the king pin and thereby lock the king pin with respect to the trailer upon turning movement of the jaw, said jaw having a concentric drum surface, a pair of cables each having one end attached to the jaw and each contacting the drum surface, a cross shaft mounted to turn on the trailer frame and extending between said drop-leg assemblies, at least a portion of the cross shaft extending above the level of said under surface, said cables extending longitudinally from the drum surface in substantially parallel relationship toward the cross shaft and extending at least partially around the cross shaft in opposite directions, means for securing one end of each cable relative to said cross shaft, whereby turning movement of said jaw causes corresponding turning movement of said cross shaft, and means whereby turning movement of the cross shaft operates said drop-leg assemblies.

7. For use with a tractor having rear wheels and having an upstanding king pin, a semi-trailer having, in combination: a frame provided with a pair of drop-leg assemblies widely spaced and positioned near the side boundaries of the frame, each drop-leg assembly having a stationary housing projecting downward from said frame, said housings being positioned near the forward end of the trailer to minimize the swing clearance with respect to the rear wheels of the tractor, said frame including a front portion extending forward of said drop-leg assemblies and having an under surface provided with a longitudinal guide slot to receive the king pin, a jaw mounted to turn on the front portion of the frame about a vertical axis, said jaw having an open-ended channel to accept the king pin and thereby lock the king pin with respect to the trailer upon turning movement of the jaw, said jaw having a concentric drum surface, a pair of cables each having one end attached to the jaw and each contacting the drum surface, a cross shaft mounted to turn on the trailer frame and extending between said drop-leg assemblies, said cables extending longitudinally from the drum surface in substantially parallel relationship toward the cross shaft and extending at least partially around the cross shaft in opposite directions, means for securing one end of each cable relative to said cross shaft, whereby turning movement of said jaw causes corresponding turning movement of said cross shaft, and means whereby turning movement of the cross shaft operates said drop-leg assemblies.

\* \* \* \* \*